Sept. 16, 1969　　　　　A. COROMPT　　　　3,467,268
APPARATUS FOR HANDLING AND TRANSPORT OF HEAVY BULKY CONTAINERS
Filed March 20, 1968　　　　　　　　7 Sheets-Sheet 1
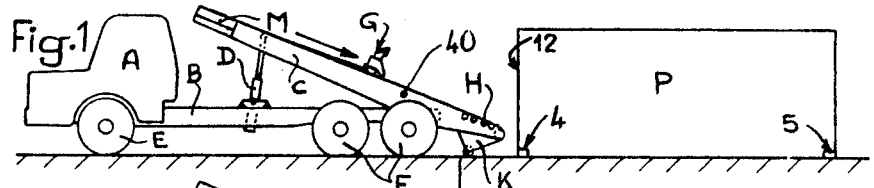
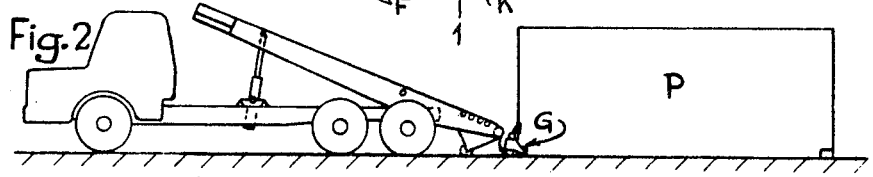
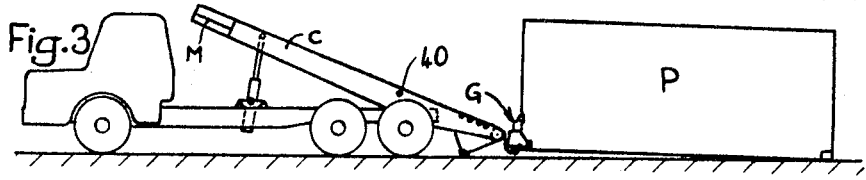
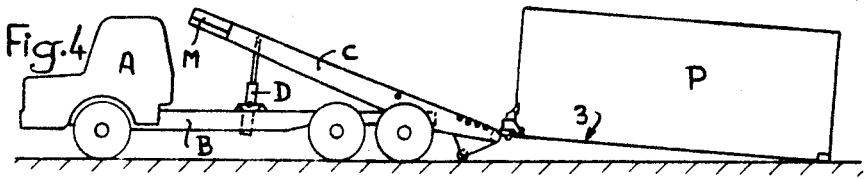
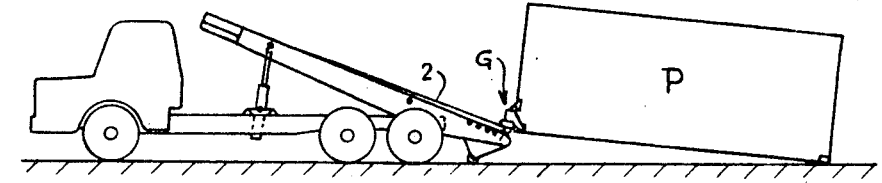
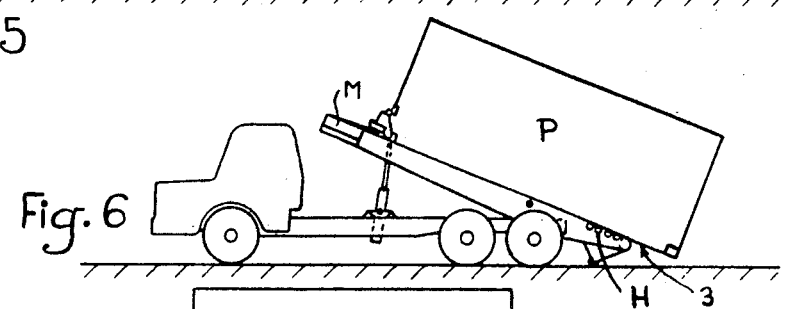
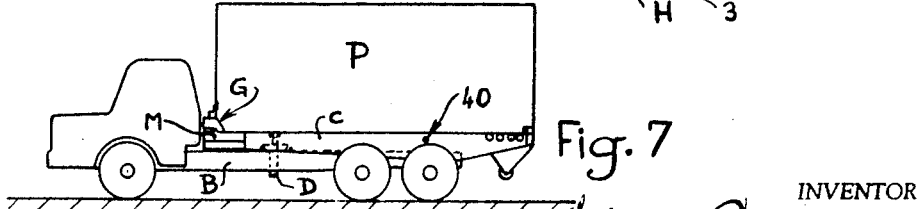
INVENTOR
Antoine Corompt
BY Alexander Nudell
ATTORNEY Sept. 16, 1969     A. COROMPT     3,467,268
APPARATUS FOR HANDLING AND TRANSPORT OF HEAVY BULKY CONTAINERS
Filed March 20, 1968     7 Sheets-Sheet 2
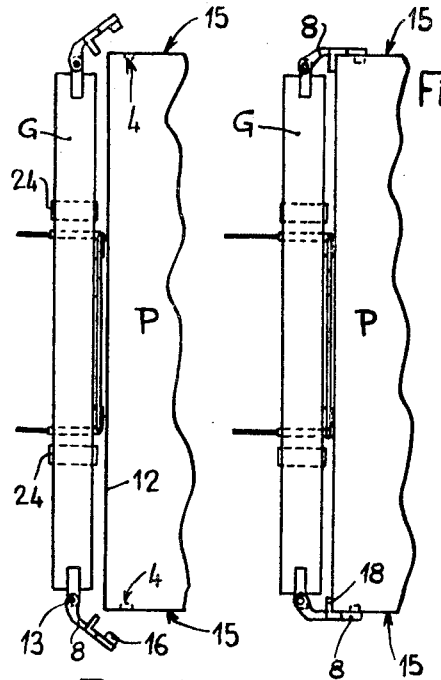
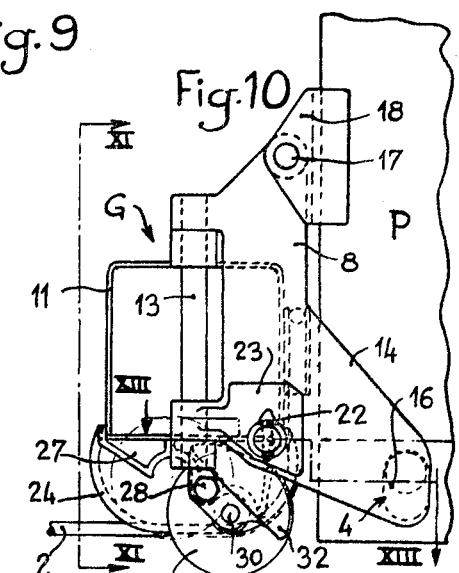
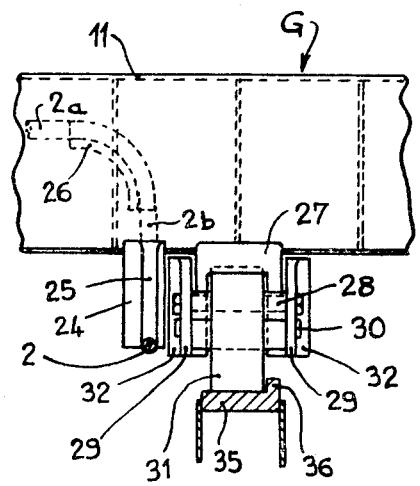
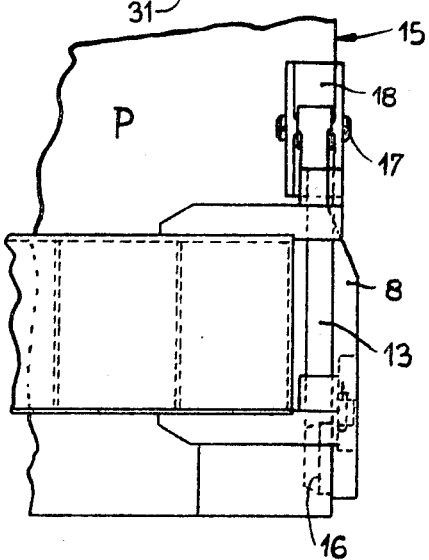
INVENTOR
Antoine Corompt
Alexander Howell
BY
ATTORNEYS

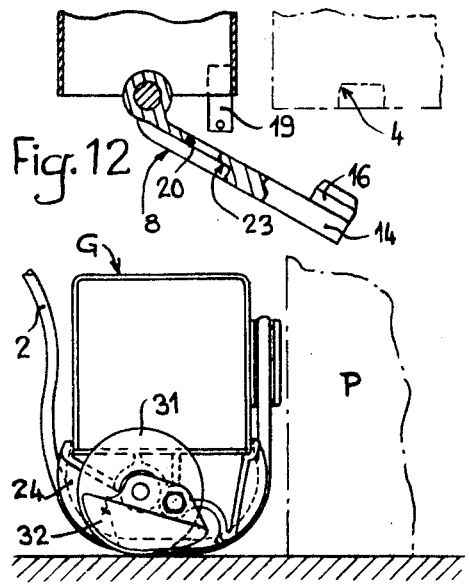

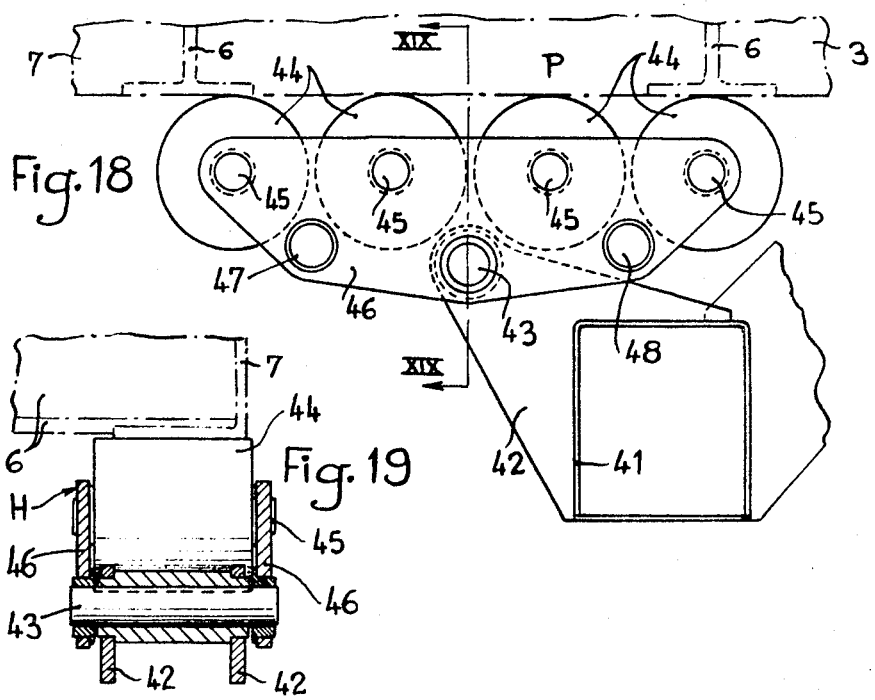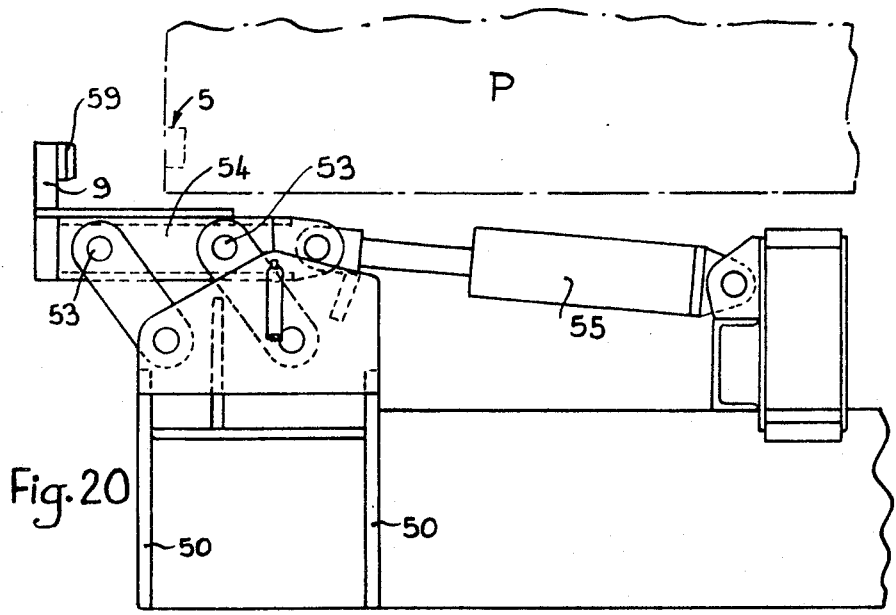

Sept. 16, 1969     A. COROMPT     3,467,268
APPARATUS FOR HANDLING AND TRANSPORT OF HEAVY BULKY CONTAINERS
Filed March 20, 1968     7 Sheets-Sheet 6

INVENTOR
Antoine Corompt
Alexander Mowell
BY
ATTORNEYS

Sept. 16, 1969  A. COROMPT  3,467,268
APPARATUS FOR HANDLING AND TRANSPORT OF HEAVY BULKY CONTAINERS
Filed March 20, 1968  7 Sheets-Sheet 6
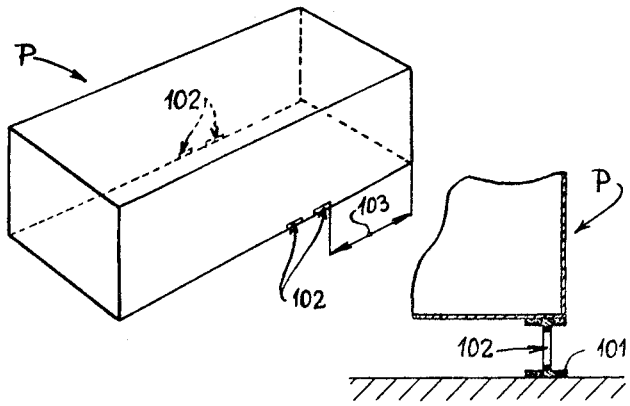
Fig. 25
Fig. 26
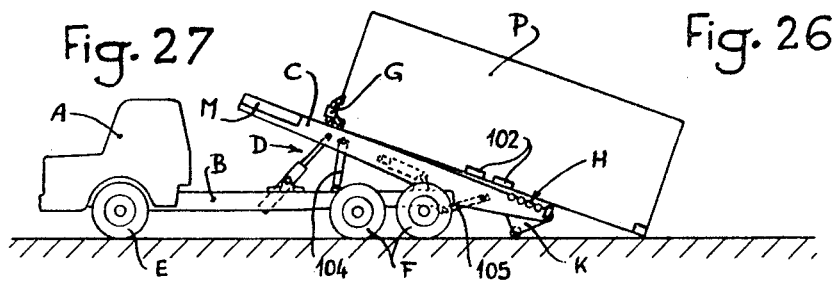
Fig. 27
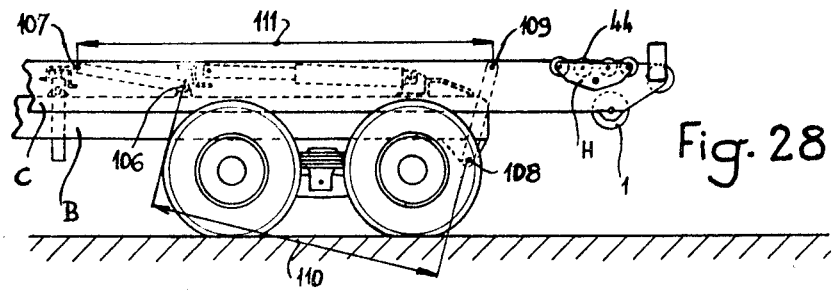
Fig. 28
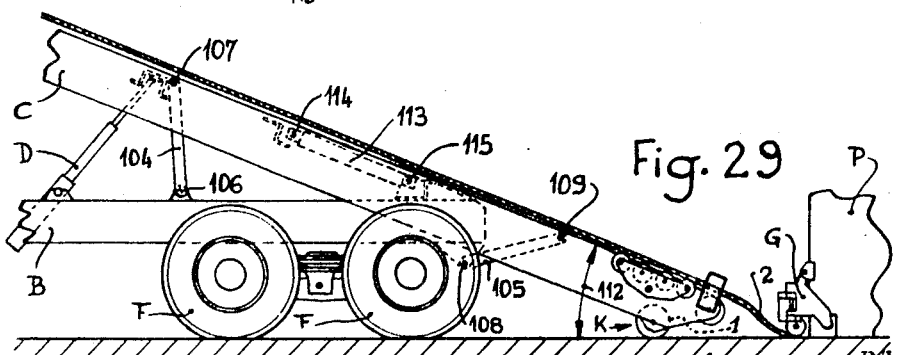
Fig. 29
INVENTOR
Antoine Corompt
Alexander Howell
BY
ATTORNEYS

United States Patent Office 3,467,268
Patented Sept. 16, 1969

3,467,268
APPARATUS FOR HANDLING AND TRANSPORT OF HEAVY BULKY CONTAINERS
Antoine Corompt, Saint-Etienne, Loire, France, assignor to Etablissements Bennes Marrel, Saint-Etienne, Loire, France, a joint stock company
Filed Mar. 20, 1968, Ser. No. 718,306
Claims priority application France, Dec. 29, 1967, 49,487
Int. Cl. B60p 1/04
U.S. Cl. 214—505      11 Claims

ABSTRACT OF THE DISCLOSURE

Apparatus for loading a container on to a road vehicle and unloading it, from the ground, in which the vehicle has a false tilting chassis on which a girder runs, the girder having clamps to engage the container. When a container is to be lifted on to the vehicle, it is driven backwards to the container and the false chassis tilted till its rear end rests on the ground in front of the container. The girder is run down the chassis by a winch cable, and the clamps on it applied to the container. The winch now lifts the container end, and rollers on the end of the false chassis enable the vehicle to roll under the container as it is winched on to the false chassis. On arrival at its correct position the false chassis is levelled, and further clamps are applied to secure the rear of the container.

---

The present invention relates to improvements in apparatus of the type used for the handling and transport of containers which are very heavy and bulky.

Containers of standard weight and dimensions are known and are at present used in international transport, whether land, maritime, or aerial. In stations, in ports or at airports, it is necessary to provide a special lifting apparatus to handle these containers which are of a rectangular parallelopiped form and are provided with lifting orifices located in the region of the four corners of their lower or upper surfaces. The containers must be lifted only by engagement with these orifices. The floor of a container is formed of a plate of sheet steel carried by two longerons and by cross beams, and it is important to be able to handle the container without having to reinforce this floor further.

For this purpose, it is known to use cranes, loading gantries or travelling gantries of great power specially provided for this purpose. This lifting apparatus is expensive and cumbrous, since the weight of a container may reach thirty metric tons and its greatest length about twelve metres.

A container having thus been loaded on a lorry from a freighter or from a railway wagon, it is then transported by road to the user, who must in turn have an unloading quay, a crane or a gantry of great lifting power to unload the container.

The invention has as its principal object the avoidance of these inconveniences while providing a road transport vehicle which is able to load onto its platform under its own power a container which is placed on the ground, to transport it to the user, and to unload it, still under its own power.

The invention proposes to resolve this problem while still observing the provisions of the road transport laws, which impose an important additional restriction, since the maximum authorised load limits exceed in size the external size of the standard type container by only six centimetres. The handling of this container must therefore be carried out by an assembly which does not project more than three centimetres on either side.

An apparatus according to the invention is provided on a road transport vehicle equipped with a tipping false chassis which is actuated by an elevator mechanism, and it includes a rolling stand provided at the rear of the false chassis in such a way that the chassis is supported on the ground when it is raised for loading or unloading; together with a winch incorporated at the forward end of the false chassis in such a way as to actuate a cable from which is suspended a transverse girder which comprises two retractable rollers adapted to roll on rails on the false chassis, or to be retracted automatically when the girder is placed on the ground where it then rests on shoes. This girder also comprises at each end an attachment plate articulated about a vertical axis and able to be fixed to the girder after being turned down to the front perpendicularly to the latter, with the object of introducing an anchoring, with which the said fastening is provided, to a corresponding forward lateral aperture of the container. The attachment plate is also provided at its apex with a shoe which is supported against the front of the appropriate forward mounting of the container. According to a preferred embodiment of the invention, which allows the handling of containers which are very heavily loaded without the risk of deforming the face or floor, two bogies are provided at the forward end of the tipping false chassis, each bogy provided with several rollers, which extend slightly above the rolling surface defined by the rails of the false chassis. Each bogy may have four rollers, distributed in such a manner that at least one of them is always situated to the right of one of the cross beams of the base of the container. To complete the assembly, the front of the false chassis is provided with two bars which move transversely under the action of jacks, with the object of applying plates provided with clamp pins to the front of the lateral faces of the container which engage with the handling orifices of the container; the action of these clamp bars provides an automatic recentering of the rear of the container on the false chassis of the road vehicle, which prevents any faulty distribution of the load which may arise during the loading of the container onto the road vehicle.

There are standard containers of which the floor is weakened locally by the presence of lateral openings or passages for fork trucks, the openings traversing the centre of the longerons of the base. Thus if the said longerons are made to roll over one or more of the pulleys of the bogies with which they are in point contact, it is found in practice that the base tends to bend or to be deformed locally in the region of the said openings for fork truck lifting.

As the container must be handled just as it is, without adding any reinforcing members, since its characteristics are fixed by international conventions, a variant of the present invention concerns a particular apparatus for road vehicles with a hinged false chassis capable of handling standard containers without damaging their bases.

As stated above, the apparatus comprises a false chassis provided with an elevator mechanism allowing it to be tipped at its connection to the carrying chassis of the lorry or the like, the front of the false chassis being provided with a winch, the cable of which is joined to a mobile girder bolted on to the front of a container which is on the ground, while in addition the front of the hinged false chassis is provided with two lateral rolling bogies on the top of which the cradle of the container is caused to roll in the course of handling. The embodiment is principally distinguished in that the false chassis is carried on the articulated ends of two pairs of struts whose lower extremities in turn pivot on the chassis of the vehicle in such a way as to define an articulated quadrilateral, the distance between the pivots and the struts on the chassis being less than the distance between the pivots on the false chassis, while finally, a jack is provided between the false chassis and the real chassis, disposed longitudinally under the false chassis and orientated in a direction which tends to push the false chassis towards the front of the vehicle.

It can be seen that the method of articulating the false chassis not merely on one pivot axis carried by the chassis but on the deformable quadrilateral constriction permits the false chassis to be lowered relative to the chassis and to push its lower end further to the rear of the vehicle to such an extent that the angle formed between the false chassis and the horizontal is relatively small, even when the end of the false chassis is placed on the ground. Thus, taking into account the location of the fork passages on the cradle of standard containers, these passages will already be located ahead of the carrying bogies, when, in the course of loading, the base of the container is to be supported on these bogies. Thus the apparatus according to this embodiment only allows the container to roll on the bogies in the regions where the base presents the maximum rigidity.

According to another embodiment of the invention the carrying rollers of each bogy are equipped with an endless caterpillar track of which each link has a length substantially equal to the distance between the axes of two consecutive rollers. In this way, all point contact between the longerons of the cradle and the carrying bogies is avoided, since at each instant each carrying link is supported by two adjacent rollers.

The accompanying drawings, given by way of example, enable the invention to be better understood, together with the various features thereof.

FIGS. 1, 2, 3, 4, 5, 6 and 7 illustrate successive phases of the loading of a road vehicle under its own power according to the present invention, beginning with a container placed on the ground.

FIG. 8 is a plan view of the lifting girder of the apparatus when it is placed in front of a container placed on the ground (as in FIG. 2).

FIG. 9 is a similar view after the girder has been clamped to the container.

FIG. 10 is an elevation showing on a larger scale the details of the girder bolted on the front of the container, when the latter is rolling on the false chassis (as in FIG. 6).

FIG. 11 is an axial section on the line XI—XI of FIG. 10.

FIG. 12 is a section in plan of one of the extremities of the girder before being clamped to the container, as illustrated in FIG. 8.

FIG. 13 is a similar view in section along the line XIII—XIII of FIG. 10 showing the girder after being clamped.

FIG. 14 is an elevation of the front of the container after the girder has been clamped on, when the assembly is still resting on the ground (as in FIG. 2).

FIG. 15 is a similar view when the front of the container is beginning to be lifted (as in FIG. 4).

FIG. 16 shows the arrangement of the rollers of the girder as they encounter the end of the false chassis (as in FIG. 4).

FIG. 17 shows the girder in position on the false chassis where it rolls by means of its rollers (as in FIG. 5).

FIG. 18 is an elevation of one of the lateral bogies which are provided on the end of the false chassis to receive the bottom of the container.

FIG. 19 is a section along the line XIX—XIX of FIG. 18.

FIG. 20 is a view facing the end of the false chassis after the container has been loaded, and before it is locked in position.

FIG. 25 is a perspective view showing schematically the position of fork passages on certain types of standard international container.

FIG. 26 is a partial transverse section of the cradle, at right angles to one of the fork passages.

FIG. 17 illustrates schematically the manner in which a form of the invention is used to load a container onto the false chassis, the position corresponding to the moment which immediately precedes the contact of the cradle with the container with the carrying bogies.

FIG. 28 shows the rear of the lorry when empty in position for travelling.

FIGS. 29, 30, 31 and 32 are partial views showing the different successive steps of loading a container, FIG. 30 illustrating in particular a detail of FIG. 27.

An apparatus according to the invention comprises a road vehicle which is constructed in the known manner with a cabin A, a chassis B, a false chassis C, and an elevator mechanism D. The vehicle has front wheels E and rear wheels F. This arrangement is known.

In addition, the apparatus according to the invention is pricipally distinguished in that it comprises a girder G adapted to roll on the rails of a false chassis C, which false chassis comprises at the rear two lateral bogies H and a supporting stand K provided with rollers 1. The movements of the girder G are controlled by a winch M which is positioned at the front of the false chassis C. The connection between the winch M and the girder G is made by a cable 2 which will be described later in detail.

Figure 22:
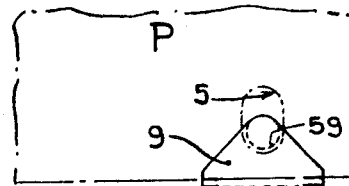
FIG. 22 is a corresponding lateral view after locking, in the direction of the arrow XXII in FIG. 21.

This arrangement provides a vehicle for handling and transport of containers P which are currently used for international transport. These containers may reach a total weight of about thirty metric tons and a length of the order of 12 metres. They comprise a base 3 which is provided at its four corners with lateral holes for handling, which are shown by the reference numeral 4 (FIGS. 1, 8, 10 and 12) at the front, and at the rear with reference numeral 5 (FIGS. 1, 20 and 22). The base 3 of the caisson P is formed in a known manner of a sheet of metal not shown in the diagram under which there are distributed cross-beams 6 between two longerons 7.

When a container P is placed on the ground (FIG. 1) the problem consists of loading it onto the false chassis C, using only the means provided in the road vehicle, that is without using either a traversing gantry or a lifting crane. Additionally, the handling should be carried out using only the holes 4 and 5. The handling, however, should not damage the base 3 which should be used as it is, without reinforcement members.

Finally, the loaded lorry (FIG. 7) should satisfy the provisions of the laws pertaining to highways, particularly where they concern the overall size. Given that the standard size of a container P is smaller by only six centimetres than the limit imposed by the law, it is clear that it is necessary to carry out the handling and the securing thereof of utilising front attachment members 8 (FIGS. 9 and 13) and lateral plates 9 (FIGS. 21 and 24) whose thickness 10 does not exceed three centimetres.

The elements G, H, K and M therefore present the following characteristics:

The girder G (FIGS. 8–17) comprises a parallelopiped cross beam 11 fabricated from sheet metal, which is to be applied to the front panel 12 of the container P. At each extremity, the cross beam 1 has a vertical pivot 13 for a clamp 8. This is formed of a piece of metal provided with a flat arm 14 which fits against a corresponding lateral panel 15 of the container P. This arm 14 is provided on its lower part with a pin 16 which extends laterally to fit into the adjacent depression 4.

In addition, at its apex, each member 8 has horizontal pivot 17 for a shoe 18, which has the plan profile of a T section. This shoe 18 is to be applied simultaneously to the panels 12 and 15 of the container P, fitting over the corresponding angle, as shown in FIGS. 9, 10 and 11. The shoe 18 thus forms a simple, adjustable locating surface for the clamp 8 when the latter is fitted to the front of the container.

The cross beam 11 also has at each end a fixed pin 19 which extends horizontally in such a way as to engage in a hole 20 in the clamp 8 when the latter is turned back as shown in FIGS. 12 and 13. In addition, the protruding part of the pin 19 has a transverse bore 21 (FIG. 13) in which a keeper pin 22 (FIG. 10) is inserted to lock the clamp 8 to the front of the container. In order that the end of the pin 19 does not extend passed the limit of size defined by the clamp 8 when the latter is opened (FIGS. 13 and 10), the hole 20 is placed at the bottom of a depression 23 provided in the external lateral face of the member 8. The depth of the depression 23 is sufficient to house the keeper pin 22 and the protruding part of the pin 19.

The girder G also comprises two rounded shoes 24 welded onto the lower face of the cross beam 11, so as to rest directly upon the ground along with the base 3 of the container on the front of which the assembly is clamped (FIGS. 2 and 14). Each shoe 24 is provided with a peripheral neck 25 to receive the cable 2 (FIGS. 11, 6 and 17). In this way, the cable 2 is not displaced when the shoes 24 rest on the ground.

To facilitate the handling of a container a lightweight winch N is provided with a relatively flexible cable 2, i.e., one which is of relatively small diameter. In view of the weight of the container which is to be moved, it is necessary to double the cable 2. For this purpose, on the rear face of the cross beam 11 of the girders G two return pullies 26 are welded, and part of the cable 2a runs horizontally between them. On either side of the pullies 26, the cable 2 forms two vertical parts 2b which abut the necks 25 of the shoes 24. The cable 2 thus extends, doubled, in front of the shoes 24 of the girder G, and at each of its two extremities (not shown) it is anchored on the drum of the winch M.

Outside the shoes 24, a fork 27 is welded on the lower face of the cross beam 11 of the girder G, to carry a horizontal pivot 28 (FIGS. 10 and 11). On the ends of this pivot 28 two movable supports 29 are articulated and are joined by a pivot 30 around which a roller 31 turns freely. The movable supports 29 are provided with counterweights 32 located so as to place the pivot 30 of the roller ahead of the vertical plane defined by the pivot 28, when the girder G is suspended from the cable 2 as shown in FIG. 15.

In addition, the fork 27 comprises two stops 33 and 34 placed on either side of the pivot 28, respectively in front of and behind the latter. The stop 33 is also placed above the pivot 28 while the stop 34 is lower. Thus, the result is that, when the pivotable supports 29 are made to pivot so as to bring the pivot 30 abutting against the bottom of the stop 33, the roller 31 is in the retracted position (FIG. 14); i.e. it does not extend below the lower plane defined by the shoes 24. In this case, the girder G rests on the ground on the shoes 24 while the rollers 31 remain retracted. When the girder is raised, the counterweights 32 cause the rollers 31 to descend as shown in FIG. 15. If then the supports 29 are made to pivot to the rear (FIGS. 16 and 17), the pivot 30 on each roller 31 abuts against the rearmost stop 34 of the fork 27 and the roller 31 then extends below the lower plane defined by the shoes 24. Furthermore, the rollers 31 are then able to support a load, since their pivots 30 are then situated behind the vertical plane defined by the pivot axis 28 (FIG. 17).

The rollers 31 roll on longitudinal rails 35 (FIGS. 11, 16 and 17) which are provided on the upper surface of the false chassis C. Each rail 35 is provided with a guiding flange 36 at the side, which extends upwardly.

At its rearward end, the false chassis C is provided with a transverse pivot 37 on which a mounting roller 38 turns freely. The latter is provided with two necks 39 devised to correspond to the necks 25 of the shoes 24, in order to avoid crushing the cable 2 when the girder G mounts the rear of the false chassis C as illustrated in FIGS. 4, 5 and 16.

At its rear end, which overhangs the pivot axis 40 on the chassis B of the lorry (FIGS. 1, 3 and 7), the false chassis is integral with a support K which is dimensioned in such a way that its roller 1 is supported on the ground when the elevator mechanism D is operated, which allows the lorry to push back underneath the container during loading (FIGS. 4 to 6) while avoiding any excessive sagging of the rear of the vehicle.

Finally, the false chassis comprises a fixed cross beam 41 (FIG. 18) immediately in front of the mounting roller 38, provided with two forks 42 which each carry a transverse horizontal pivot 43. On these pivots 43 two bogies H are articulated, each one comprising several rollers 44, which turn freely on axles 45. In the arrangement illustrated in FIGS. 18 and 19, each bogy H has four rollers 44, and pivots 45 being held by two lateral cheeks 46 with a corresponding pivot 43. Transverse pins 47 and 48 interconnect the two plates 46 of each bogy H, which by engagement with the fork 42, limit the amplitude of the pivoting movement of the bogy.

The rollers 44 of the bogies H extend slightly above the rails 35 in such a way to receive the lower face of the container P which rolls thereon by means of its longerons 7. The number and spacing of the rollers 44 of each bogy H is chosen in such a way as always to have at least one cross beam 6 of the base 3 of the container P above a roller 44, as illustrated in FIG. 18. This arrangement avoids any deformation of the base 3 by the weight of the load of the container, and allows the standard containers to be handled as they are, without needing any rein-forcement of the base 3.

Figure 21:
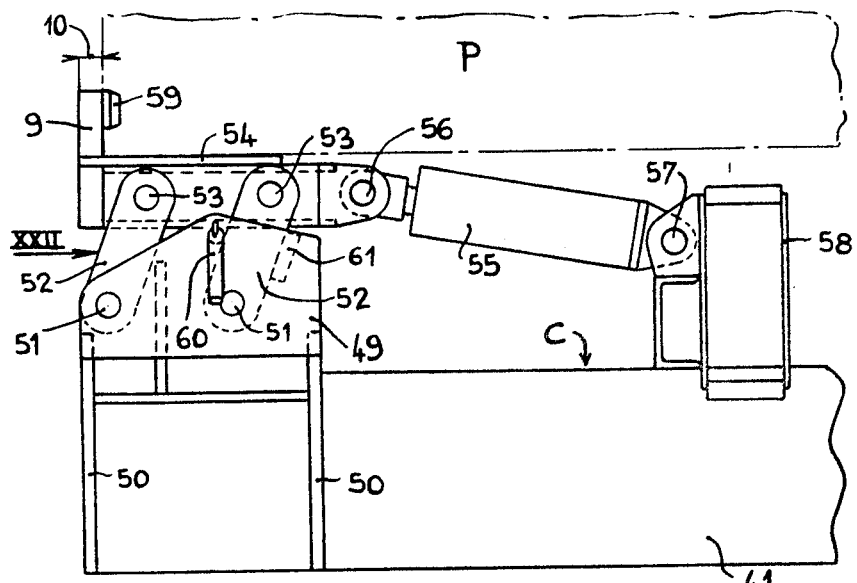
FIG. 21 is a similar view after the front of the container has been locked to the vehicle.
Figure 23:
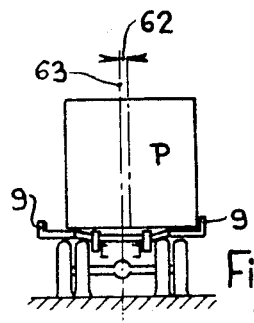
FIGS. 23 and 24 are schematic views of the rear of the lorry, correspondings respectively to FIGS. 20 and 21 and showing how the locking assembly according to the invention also causes recentering of the container after it has been loaded onto the vehicle.
Figure 24:
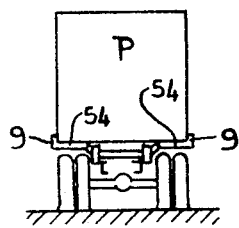
Figure 30:
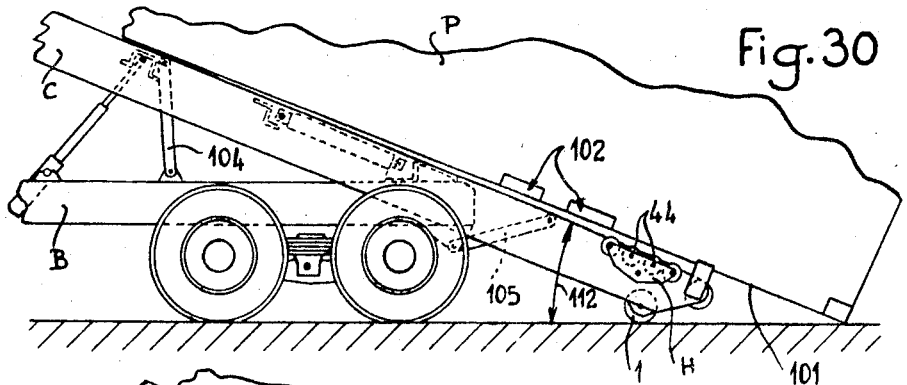
Figure 31:
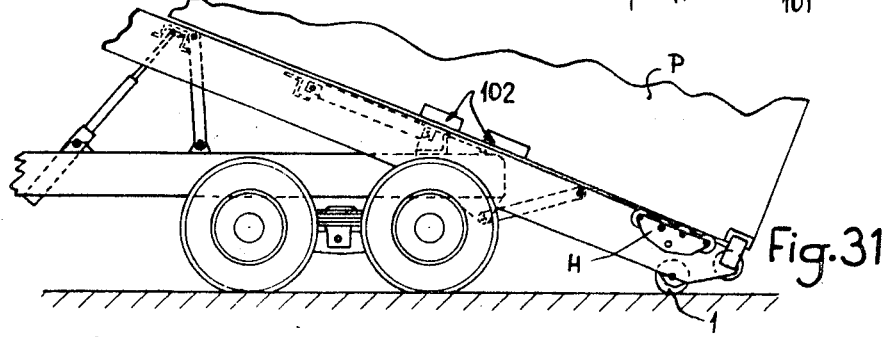
Figure 32:
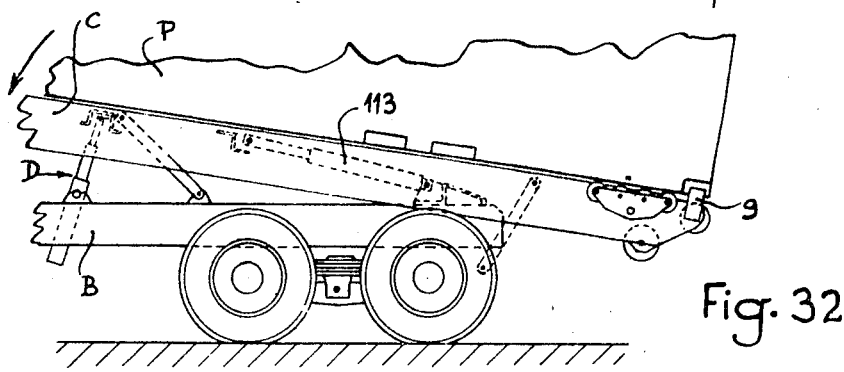

To complete the assembly, on the rear of the false chassis C, there are provided two transverse forks 49 situated parallel to the cross beam 41, welded on intermediate cross pieces 50 (FIGS. 20, 21 and 22). Each fork 49 carries two longitudinal pivots 51 on which are articulated the lower ends of two pairs of pivotable struts 52, while the other ends of the two pairs of struts 52 are joined by pivots 53 to a plate 54. The two pivots 51 and the two pivots 53 are located at the apices of an articulated parallelogram which allows the plate 54 to be moved while remaining constantly parallel to the cross beam 41. This movement of the plate 54 is effected by a jack 55 to which it is connected by a pivot 56, while the other end of this jack is pivoted at 57 to a support 58 on the false chassis C. Each plate 54 is integral at its free end with the corresponding clamp plate 9. This plate is placed vertically, and it has a clamp projection 59 on its internal face which extends laterally, and which engages in the adjacent depression 5 of the container. The assembly is dimensioned in such a way that, when the two plates 9 are clamped to either side of the rear of the container (FIGS. 21 and 24), the upper parts of the struts 52 are inclined towards the container, whereas, they inclined away from the container when the clamp systems 9, 54, 55 are open in the receiving position (FIGS. 20 and 23). Each pair of struts 52 pivots about a neutral position defined by the vertical plane of its lower pivot 51. It can be seen that, for this position, the plate 54 passes the highest point in its tragectory, if a position in which it slightly lifts the container. As it is a matter of unstable equilibrium, the weight of the container tends to reinforce the clamping action by drawing the plates 54 towards each other (FIGS. 27 and 24). The assembly is locked in this position by engaging in each fork 49 a pin 60 which immobilises the corresponding pair of struts 52 against an end stop 57 welded onto the said fork 49.

The operation is as follows:

To load the container P, which is resting directly on the ground (FIG. 1), the lorry A–B–C–D is reversed, and its false chassis C is lifted by extending the jack D. The winch M is then activated to unroll the cable and deposit the chassis end on the ground. The girder G normally rests suspended at the rear of the vehicle when the vehicle is travelling empty.

The girder G being thus located near the front of the container, it is clamped to it (FIG. 2) by closing the two clamps 8 as shown in FIGS. 12 and 13, while the cable 2 remains slack. During this operation the girder G rests on the ground on its shoes 24 (FIG. 14), and its rollers 31 remain automatically retracted. The winch M is then started to wind up the cable 2, which raises the girder G under the front of the container (FIGS. 3 and 15). As soon as the shoes 24 leave the ground, the counterweights 32 automatically pivot the rollers 31 downwards.

The winding of the cable 2 on the winch M is continued, while the lorry A–B–C–D is put into neutral gear, which allows it to travel back automatically underneath the container (FIGS. 4 and 16). The shoes 24 come to the level of the mounting roller 38, and the rollers 31 are held to the rear by the lower extremities of the rails 35. The pivots 30 of the rollers 31 then engage automatically against the rearmost stops 34 as shown in FIGS. 5 and 17. The front of the container then rests on the rails 35 by means of the rollers 31 of the girder G which approaches the winch M simultaneously and proportionately with the rearward movement of the lorry.

Towards the end of this operation, the rear of the container leaves the ground while its base 3 is supported on bogies H as shown in FIGS. 6, 18 and 19.

When the girder G comes to the level of the winch M, the latter is stopped and the false chassis C is allowed to drop back on the chassis B by contracting the jack D (FIG. 7). This action can be made automatic, by connection with the reservoir of the hydraulic circuit. The container then occupies the position shown in FIG. 23, and if its rear portion may be displaced laterally by a distance 62 relative to the longitudinal plane of symmetry of the lorry 63. This displacement may result from errors of perception during the manoeuvre, or from irregularity in the ground on which the lorry has moved when moving back to the container. This displacement is compensated by simultaneously actuating two jacks 55 which operate the clamps for the rear of the container by means of the projections 59 of the plates 9. Each jack 55 acts until one of the pairs of struts 52 bears against its end stop 61 (FIG. 21), so that the rear of the container, temporarily lifted by the plates 54, is displaced transversely by the plates 9 to the desired position in the exact centre (FIG. 24). The loaded vehicle is thus ready to move off, and it can be seen that its outline conforms to the requirements of the road transport laws.

Having arrived at its destination, the lorry may then unload the container P under its own power, by placing it on the ground by means of a manoeuvre, the reverse of that which has been described above.

In FIGS. 25 to 32 there is shown a further embodiment which is particularly adapted to the handling of standard containers which comprise a cradle formed of later longerons 101 of I-cross section, into which are cut openings 102.

These openings 102 form passages for forks for known handling apparatus which are not the concern of the present description. In principle, the base of the container P includes on either side two openings for fork passages 102, as shown schematically in FIG. 25. The presence of these openings weakens the particular longerons 101 which have tendency to deform at that level if they are made to roll by point contact on rollers. Such a container cannot therefore be handled by the system above described, without the longerons 101 of the cradle being distorted at the openings for the fork passages 102 by rolling on the carry rollers 44 of the bogies H (FIG. 28).

The embodiment shown eliminates this inconvenience by taking into account the fact that the openings for fork passages 102 of standard containers are spaced from the rear of the container by a considerable distance 103. This distance could be of the order of half or a third of the length of the container.

The tipping false chassis C is here joined to the carrying chassis B, not by a pivoting axis, but by two combinations of pivoting struts 104 and 105. The pivoting axes of the strut or struts 104 are shown by reference numeral 106 on the chassis B and 107 on the false chassis C (FIG. 29). The strut or struts 105 are also pivoted at pivots 108 on the chassis B and at 109 on the false chassis C.

According to the embodiment, the pivot 108 at the rear extremity of the chassis C is situated below the level of the latter, closer to the ground than the pivot 106, which is situated in front of the rear wheels F. In addition, the distance 110 between the pivots 106 and 108 (FIG. 28) is less than the distance 111 between the pivots 107 and 109, while the lengths of the struts 104 and 105 are substantially equal. Thus, the pivots 106, 107, 108 and 109 define the apices of a deformable quadrilateral, the movement of which brings about the rearward movement of the false chassis C relative to the chassis B as it is lifted. Thus, at the end of the manoeuvre, when the rollers 1 of the support projection K are placed upon the ground (FIGS. 29, 30 and 31), the angle of inclination 112 of the false chassis C to the horizontal is relatively small, while the projection K is extended quite far to the rear of the chassis B of the vehicle.

The assembly according to the invention is completed by a single jack 113 situated longitudinally under the false chassis C. The ends of this jack 113 are articulated on pivots 114 and 115 (FIG. 29). The pivot 114 at the front end of the jack 113 is integral with the false chassis C, while the pivot 115 at the rear end of the same jack is attached to the chassis B.

The control of the false chassis C is carried out by hydraulic means of known type acting on the elevating mechanism D when it is required to lift the false chassis C, and on the single jack 113 to bring the false chassis C back to the horizontal on the chassis B. This control can be carried out automatically by a hydraulic distributor which the operator puts as required into the position "raise" or "lower."

The operation is as follows:

When the operator wishes to load a container resting on the ground, he drives the vehicle A–B–C in reverse to the front of the container with the false chassis C in the transport position on the chassis B, as shown in FIG. 28. Then, by activating the lifting mechanism D, he raises the false chassis C until the rollers 1 of the support projection are on the ground (FIG. 29). The operator unwinds the cable 2 and attaches the mobile girder G to the front of the container. Then he activates the winch M so that the cable 2 hoists the container proportionately and simultaneously with the rearward movement of the vehicle A–B–C under it. Because of the articulation of struts 104, 105 which allows the support rollers 1 to be placed well to the rear of the chassis B, it can be seen from FIG. 30 that the base 101 of the container does not reach a position parallel to the upper surface of the false chassis C until the fork passage openings 102 are in front of the bogies H. Thus, when the longerons 101 of the cradle are supported on the rollers 44, the weakened zones corresponding to the fork passage openings 102 are already in front of the bogies H, so that when the container rolls on the bogies H during the last phase of loading (FIG. 31), the rollers of these bogies do not damage the longerons 101 of the cradle.

At the end of loading, the clamping of the container to the false chassis C is carried out as above described by the locking plates 9.

The assembly formed by the false chassis C and by the container is finally dropped back onto the chassis B (FIG. 32) by bringing about the extension of the jack 113, while the elevator mechanism D is left free to contract.

It can be seen that the jack 113 is useful in that the mounting of the struts 104 and 105 as an articulated quadrilateral makes it necessary to bring the false chassis C towards the front of the lorry at the same time as its forward end, where the winch M is situated, is lowered.

Figure 33:
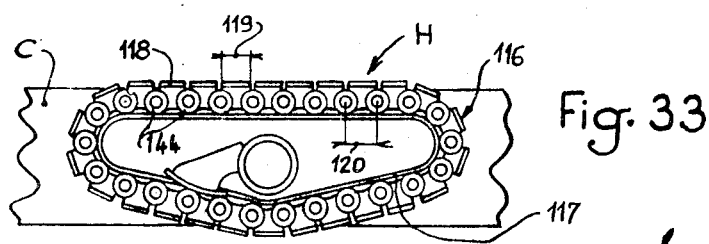
FIG. 33 shows a further possible embodiment of the invention in particular, a bogy in which the rollers are movable and are equipped with an endless caterpillar track.

According to another embodiment of the invention, to improve the operation further by definitely avoiding all deformation of the longerons 101 of the cradle during the course of handling, bogies H are used of the type illustrated in FIG. 33. In this case, an endless caterpillar track 116 integral with the axles of the carrying rollers 144, circulates in a closed path 117. It can be seen that the length 119 of each plate of the caterpillar 116 is substantially equal to the distance between the axes 120 of two consecutive rollers 144. Thus, at any instant, each carrying link 118 of each caterpillar track 116 is supported simultaneously by two rollers 144, and supports the corresponding longeron 101 of the base of the container.

It should also be understood that the preceding description has only been given by way of example and does not limit the scope of the invention, which is as defined in the appended claims.

In particular, it does not exceed the scope of the invention to provide apparatus G, H, K and M on lorries of any type, the tipping of the false chassis C may be effected by any suitable mechanism.

Similarly, the apparatus C, M, G, H, K could be mounted on an articulated vehicle or trailer, depending upon the weight of the container, and taking the Highway Laws into account.

Finally, to avoid damaging the ground in the course of manoeuvres, detachable rollers could be placed under the rear of the base 3 of the container P, that is, in the zone which rests on the ground during the phases illustrated in FIGS. 3, 4 and 5.

We claim:

1. Apparatus for the handling and transport of heavy and bulky containers on a road vehicle provided with a true chassis and a tipping false chassis pivoted thereon and actuated by an elevator mechanism, characterised in that said apparatus comprises a rolling stand provided at the rear of said false chassis and located on the ground when said false chassis is raised for loading and unloading, a winch at the forward end of said false chassis, a cable on said winch, a transverse girder with cross members connected to said cable, two-retractable rollers on said girder adapted to roll on rails on said false chassis, means for automatically retracting said rollers when said girder is placed on the ground, shoes on the end of said girder, a pair of clamp plates each hinged about a vertical axis on said girder and fixable to a cross beam thereof, a clamp pin on each clamp plate adapted to engage a container, and a shoe on the end of said plate, said shoe being supported against the front of said container when said clamp plate is in engagement therewith.

2. Apparatus as recited in claim 1, comprising two bogies at the rear of said hinged false chassis, a plurality of rollers which extend slightly above the rolling plane defined by said rails of said false chassis on each bogy, and two lateral oscillatable cheeks pivoted on said false chassis and carrying the axles of said rollers.

3. Apparatus as recited in claim 1, comprising two bogies at the rear of said hinged chassis, a closed rolling path on each bogy, and an endless caterpillar track movable round said closed path.

4. Apparatus as recited in claim 1, comprising a pivot on said true chassis on which said false chassis is articulated.

5. Apparatus as recited in claim 1, wherein the tipping action of said false chassis on said true chassis is effected by two assemblies of articulated struts defining the mechanism of a movable quadrilateral on which the four apices of each quadrilateral are formed by a first pivot placed at the rear extremity of said true chassis and below said chassis, by a second pivot placed on said true chassis in front of the rear wheels of said vehicle and further from the ground than said first pivot, by a third pivot situated on said hinged false chassis in front of said second pivot, and by a fourth pivot mounted on said false chassis to the rear of said first pivot, the distance between said first and second pivots being less than the distance between said third and fourth pivots, while the lengths of said struts are substantially equal.

6. Apparatus as recited in claim 1, comprising two bars on the rear of said false chassis which move transversely thereof, a jack for each bar, a clamp plate actuated by each bar against the rear of each lateral face of container to be lifted, a clamp projection on each plate adapted to engage with an opening defined in said container, two pairs of pivoting struts forming a deformable parallelogram situated transversely on the rear of said false chassis to carry said plate, the movement range of each pair of struts extending to one side and the other of a neutral position defined by the vertical plane of the lower pivots of said struts, and a fork on said false chassis carrying said struts.

7. Apparatus as recited in claim 6, wherein each fork has a detachable locking pin adapted to immobilise one of the two pairs of struts, and an end stop for said struts integral with said fork.

8. Apparatus as recited in claim 1, characterised in a mobile support provided with a counterweight and adapted to oscillate freely about a pivot of said girder on which its is mounted, said support carrying a pivot, and a retractable roller, said counterweights being located so as to drop the axle of each roller into a position in front of a vertical plane defined by said roller support pivot when said girder is suspended from said cable.

9. Apparatus as recited in claim 1, wherein each shoe is provided with a channel to receive said cable, a location for each shoe under a cross beam of said girder, cable return pulleys provided on the central part of the rear face of said cross beam, and two laps of cable to each shoe, the ends thereof being both anchored on the drum of said winch.

10. Apparatus as recited in claim 1, wherein each clamp plate defines an opening, a fixed pin on the cross beam of said girder penetrating said opening when said clamp plate engages said container, and a keeper pin insertable in a transverse aperture defined in the protruding extremity of said fixed pin to lock said clamp plate.

11. Apparatus as recited in claim 1, wherein the rear extremity of said false chassis is provided with a transverse axle, a mounting roller turning freely on said axle, two channels defined by said roller and adapted to coincide with the channels of said shoes so as to receive said cable without crushing it when said girder mounts the rear of said false chassis.

References Cited

UNITED STATES PATENTS 3,077,278　2/1963　Alexander ＿＿＿＿＿＿＿＿＿＿ 214—517
3,144,149　8/1964　Dempster et al. ＿＿＿＿＿＿ 214—505

ALBERT J. MAKAY, Primary Examiner

U.S. Cl. X.R.

214—517